April 30, 1957 L. L. MLYNCZAK 2,790,967
COMMUTATOR
Filed June 4, 1953
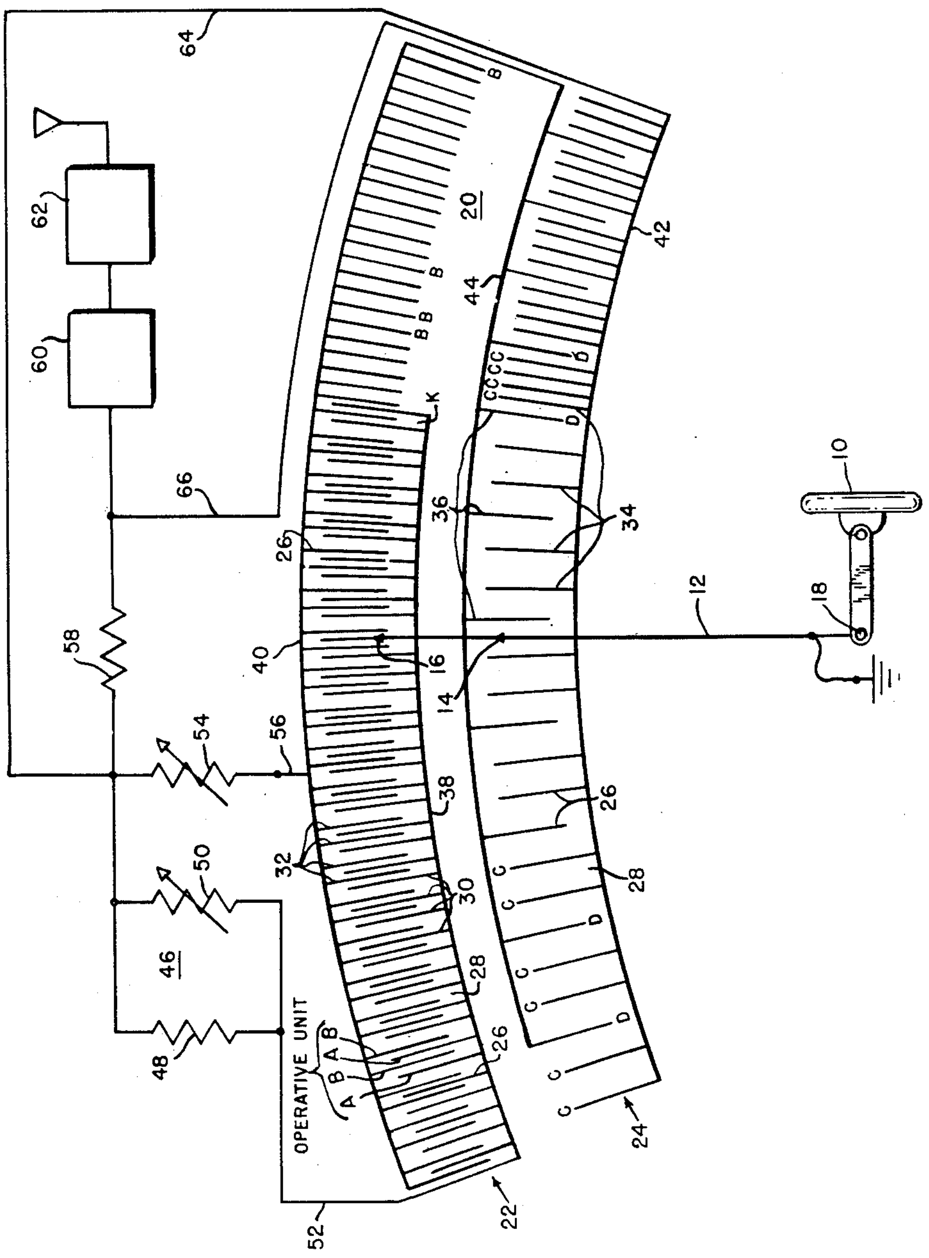
INVENTOR.
LAWRENCE L. MLYNCZAK
BY Harry M. Saragovitz
ATTORNEY 2,790,967

COMMUTATOR

Lawrence L. Mlynczak, West Allenhurst, N. J., assignor to the United States of America as represented by the Secretary of the Army Application June 4, 1953, Serial No. 359,675

3 Claims. (Cl. 340—208)

(Granted under Title 35, U. S. Code (1952), sec. 266)

The invention described herein may be manufactured and used by or for the Government for governmental purposes, without the payment of any royalty thereon.

This invention relates to condition responsive indicating apparatus and more particularly to multi-position switches in such apparatus for effecting the transmission of information relative to meteorological conditions.

There are presently in use for the purpose of upper air investigation, devices comprising airborne radio transmitters operatively associated with pressure responsive, temperature responsive and humidity responsive elements. These devices are generally referred to as radiosondes and include a pressure sensitive aneroid capsule which changes in volume when subject to various pressures in the atmosphere, thereby causing a pivotally mounted contact arm attached thereto to move along a multi-position switch or commutator having spaced alternate conducting and insulating segments. Each segment of the commutator, whether conducting or insulating, represents a certain pressure, and provides commutation between humidity and temperature, respectively. As the contact arm successively makes contact with the segments, various temperature responsive, humidity responsive and reference circuits are switched into the input of an oscillator which in turn modulates a carrier transmitter.

Heretofore, the commutator in such devices has been constructed so that certain conducting segments, spaced at relatively wide regular intervals refer to high reference points, other conducting segments at less widely spaced regular intervals refer to low reference points, regularly spaced conducting segments between these reference segments refer to humidity, and the insulating segments between the conducting segments refer to temperature.

In such a device, when the contact arm touches a low reference segment, a calibration circuit is switched into the input of a self-blocking modulating oscillator and when the contact arm touches a high reference segment, a different calibration circuit is switched into the input of an oscillator. The switched in circuits vary the input resistance of the oscillator to provide different frequency modulating signals for the low and high reference circuits respectively.

When the commutator contact arm is on any conducting segment other than the above described low and high reference segments, another circuit having a circuit operating relay therein is put into operation. This circuit generally permits a parallel combination of a resistor and a humidity element to be connected in series with the input of the oscillator and the modulating frequency being a function of the resistance in the input circuit of the modulating oscillator tube will vary with the resistance of the humidity element which is a function of the relative humidity. The resistor in parallel combination with the humidity element has been found necessary to prevent the total resistance from exceeding a figure which would cause the frequency of the self-blocking oscillator to become too low.

When the contact arm rests on any insulating segment of the commutator, the circuit operating relay in the humidity circuit remains open thus permitting a temperature element to take the place of the parallel combination of the resistor and humidity element and the input circuit of the oscillator then consists of the temperature element in series with the input of the oscillator.

The conventional device as herein set forth presents many difficulties which workers in the art have been unable to overcome. For example, to actuate the relay in the humidity circuit, a potential is constantly applied thereto, thereby placing a voltage on the humidity segments of the commutator. As the radiosonde is borne aloft, the insulating segments tend to become wet causing a decrease in leakage resistance across those segments. In these situations, the voltage which is constantly applied to the humidity segments becomes applied to the low and high reference segments, thereby applying a voltage to the input of the oscillator in these circuits and introducing an error into the temperature and humidity readings. Another difficulty encountered in such a device is the fact that the pointer of the radiosonde recorder always moves between the temperature and high reference points and never returns to zero since the contact arm, when resting upon an insulating segment, causes the temperature circuit to be put into operation. It is therefore, impossible to determine whether an error is being introduced because of leakage due to a wet transmitter. Such leakage may be caused by internal leakage of the blocking oscillator tube, leakage of the transmitter chassis and the blocking oscillator coil, leakage across components such as the transmitter or modulator-connector and other sources of leakage depending upon the particular circuit design.

In addition, the conventional commutator, as set forth, supra, requires a relay to operate the humidity circuit. This relay in itself plus the power required for its actuation results in complex problems of manufacture and great costs in power consumption.

It is, therefore, a primary object of the present invention to provide a multi-position switch for use in a radiosonde whose construction eliminates the presence of leakage therein.

A further object is to provide a multi-position switch in a radiosonde which eliminates the need for a relay to operate any of the circuits in the radiosonde thereby eliminating the battery power required to actuate said relay.

Another object is to provide a multi-position switch in a radiosonde which permits the pointer of a radiosonde recorder to return to zero at those times when the contact arm is resting on an insulating segment of said multi-position switch, thereby enabling the recorder-operator to note the presence of leakage in the transmitter.

In accordance with the present invention, there is provided in a radiosonde having a carrier transmitter modulated by a self-blocking oscillator wherein the frequency of said oscillator is varied by switching into the input thereof humidity responsive, temperature responsive and reference circuits including humidity and temperature responsive means connected to said input, switching means comprising a plurality of discrete conducting segments in spaced arrangement having insulating segments therebetween, a first portion of the conducting segments having a common connection to the temperature responsive means, a second portion of the conducting segments having a common connection to the humidity responsive means and a third portion of the conducting segments having a common connection to the input, pressure responsive means and means responsive to said pressure responsive means for successively contacting said segmeans whereby only one of said circuits is switched to said input at any one time.

Also, in accordance with the present invention, there is provided multi-position switching means for use in a radiosonde having a carrier transmitter modulated by a self-blocking oscillator wherein the frequency of the oscillator is varied by switching into the input thereof temperature responsive, humidity responsive and reference circuits comprising a plurality of spaced conducting segments having insulating segments therebetween, a first portion of the conducting segments having a common connection to said humidity responsive circuit, a second portion of said conducting segments having a common connection to said temperature responsive circuit and a third portion of said conducting segments having a common connection to said input.

For a better understanding of the invention together with other and further objects thereof, reference is had to the following description taken in connection with accompanying drawing and its scope will be pointed out in the appended claims.

Referring now more particularly to the drawing there is shown a radiosonde system incorporating a preferred embodiment of the present invention. A pressure responsive device which comprises an aneroid capsule 10 or other suitable device sensitive to changes in atmospheric pressure has attached thereto a contact arm 12, having contact points 14 and 16 in linear alignment thereon. Contact arm 12 is pivotally mounted to capsule 10 as shown at 18 and adapted to move in an arcuate path upon response to actuation from pressure capsule 10. A multi-position switch 20 comprises two arcuate strips 22 and 24 in spaced concentric relationship, each strip having a plurality of discrete radially disposed upper and lower interleaved conducting segments such as shown at 26 separated by insulating segments as shown at 28. All of the conducting strips are disposed in different discrete radii, the significance of such a construction being explained infra. Upper strip 22 comprises a group of lower interleaved segments 30, hereinafter referred to as the humidity group and a group of upper interleaved segments 32, hereinafter referred to as the temperature group. Similarly, lower strip 24 comprises a group of lower interleaved segments 34, hereinafter referred to as the low reference group and a group of upper interleaved segments 36, hereinafter referred to as the high reference group. For the purpose of explanation, the segments of the humidity group are designated as A, segments of the temperature group are designated as B, the segments of the low reference group are designated as C and segments of high reference group are designated as D. For convenience, two A segments and two B segments may be considered to be an operative group followed by a C segment with every third C segment being replaced by a D segment. It is to be understood, of course, that a point is reached where humidity measurements cannot be practicably made and therefore the humidity segments may be terminated at that point as shown in the present embodiment at point K. Obviously, where the humidity segments terminate, the spacing between the remaining segments may be appropriately decreased. The segments of the humidity group 30 have a common connection at 38, the segments of the temperature group 32 have a common connection at 40, the segments of the low reference group 34 have a common connection at 42 and the segments of the high reference group 36 have a common connection at 44. A parallel combination 46 of a resistance 48 and a humidity element 50 is connected to the segments of group 30 by means of lead 52. Humidity element 50 is a device well-known in the art and need not be described further. A temperature element 54 is connected to the segments of group 32 by means of lead 56 and comprises a suitable well-known device wherein the resistance is a function of temperature. It may be a ceramic body coated with a waterproof white material that is an efficient reflector of solar radiation or other device of like properties. Parallel combination 46 and temperature element 54 are connected to the input circuit of a blocking oscillator 60 through a resistance 58. Low reference group 34 is connected by means of lead 64 to the junction of temperature element 54 and resistance 58 and high reference group 36 is connected to the input of oscilltaor 60 by means of lead 66. Thus resistor 58 is connected between the low and high reference groups. The output of oscillator 60 is applied to transmitter 62 in the usual manner. Oscillator 60 and transmitter 62 are of a construction and operation well-known in the art and therefore the specific circuits are omitted.

Considering now the operation of the present invention, when pressure on aneroid capsule 10 decreases, the capsule expands and moves contact arm 12 causing the end of arm 12 to move across multi-position switch 20 in an arcuate path. Similarly, when the pressure on aneroid capsule 10 increases it contracts and moves contact arm 12, as described, but in an opposite direction. As contact arm 12 moves across the multi-position switch 20, the linearly aligned contact points 14 and 16 alternately make contact with conducting and insulating segments. During movement of the contact arm 12, contact point 14 will make contact with the segments of strip 24 and contact point 16 will make contact with the segments of strip 22. Since the conducting segments of both strips are disposed along discrete radii, contact can only be made with one conducting segment at any one time. For example, when contact point 16 makes contact with conducting segments A or B, contact point 14 touches the insulation between conducting segments C or C and D on lower strip 24. Similarly, when contact point 14 makes contact with one of the conducting segments C or D on lower strip 24, contact point 16 touches an insulating segment between any pair of conducting segments on upper strip 22.

As set forth supra, all of the segments of humidity group 30 have a common connection 38 which is in turn connected to the humidity responsive means in series arrangement with resistor 58. By this arrangement when contact point 16 touches one of the segments of humidity group 30, the oscillator input circuit is completed to ground through resistor 58 through the parallel connected humidity responsive means 46, the contacted segment, through connection 38, and contact arm 12. Resistance 48 is placed in parallel with humidity element 50 to prevent the total resistance from exceeding a value which would cause the frequency of self-blocking oscillator 60 to become too low.

In a similar manner, when contact point 16 touches one of the segments of the temperature group 32, the oscillator input circuit will be completed to ground from the input of oscillator 60 through resistance 58, temperature element 54, common connection 40, said contacted segment, and contact arm 12. It is to be noted that in the present embodiment, the segments of the humidity group extend only up to a certain point as above this point there is no practicable humidity measurement.

To provide reference circuits, when contact point 14 touches one of the segments of high reference group 36, the input oscillator circuit is completed to ground from the input of oscillator 60 through common connection 44, said segment and contact arm 12. When contact point 14 touches a segment of the low reference group 34, the input oscillator circuit is completed to ground from the input of oscillator 60 through resistance 58, common connection 42, said segment and contact arm 12. It is to be seen that the difference between the high and low reference circuits is the presence of resistance 58 in the low reference circuit which causes the frequency of oscillator 60 to be lower therein.

From the above description, it is obvious that there is no need for a relay to operate the humidity circuit thereby eliminating the need of any additional power for actuating such a relay. Consequently at no time is there any potential applied to any of the conducting segments, thus eliminating any leakage across any of the insulating segments should the multi-position switches become wet when the radiosonde is borne aloft. Also, since no circuit is switched into the oscillator when the contact point rests on an insulating segment, the pointer of the radiosonde recorder will return to its zero position. If it does not so return it will indicate to the recorder operator that the transmitter is wet and there is leakage therein which may be due to several causes, such as internal and chassis leakage, etc.

It, therefore, can be seen that the present invention solves many problems long present in the radiosonde commutator art. It eliminates leakage in the commutator, it eliminates the need for a relay to operate the humidity circuit and the consequent additional power necessary to actuate this relay and it permits the observation of the presence of leakage in the transmitter.

While there has been described what is at present considered to be a preferred embodiment of the invention, it will be obvious to those skilled in the art that various changes and modifications may be made therein without departing from the invention and it is, therefore, aimed in the appended claims to cover all such changes and modifications as fall within the true spirit and scope of the invention.

What is claimed is:

1. In a radiosonde having a carrier transmitter modulated by a self-blocking oscillator wherein the frequency of said oscillator is varied by switching into the input thereof, temperature responsive, humidity responsive, high and low reference circuits; a temperature responsive device, a first resistance connected between said temperature responsive device and said input, humidity responsive means comprising a humidity responsive device in parallel combination with a second resistance, one end of said humidity responsive means connected to the junction of said temperature responsive device and said first resistance, a multi-position switch comprising two strips spaced from each other, each of said strips having two groups of interleaved discrete spaced conducting segments separated by insulating segments, one of said groups having a first common connection to the other end of said humidity responsive means, a second of said groups having a second common connection to said temperature responsive device, a third of said groups having a third common connection to said input and a fourth of said groups having a fourth common connection to the junction of said first resistance and said temperature responsive device, pressure responsive means, a contact arm operatively associated with said pressure responsive means, one end of said arm grounded and pivotally mounted on said pressure responsive means, the free end of said arm being adapted to move arcuately across said switch and a contact point terminating said free end for contacting said segments whereby only one of said circuits is switched into said input at any one time.

2. In a radiosonde having a carrier transmitter modulated by a self-blocking oscillator wherein the frequency of said oscillator is varied by switching into the input thereof, temperature responsive, humidity responsive, high and low reference circuits, a temperature responsive device, a first resistance connected between said temperature responsive device and said input, humidity responsive means comprising a humidity responsive device in parallel combination with a second resistance, one end of said humidity responsive means connected to the junction of said first resistance and said temperature responsive device, a multi-position switch comprising two arcuate strips in spaced concentric relation, each of said strips having two groups of discrete spaced interleaved conducting segments separated by insulating segments, each of said conducting segments being disposed along discrete radii, one of said groups having a first common connection to the other end of said humidity responsive means, the second of said groups having a second common connection to said temperature responsive device, a third of said groups having a third common connection to said input and the fourth of said groups having a fourth common connection to the junction of said first resistance and said temperature responsive device, pressure responsive means, a contact arm operatively associated with said pressure responsive means, one end of said arm grounded and pivotally mounted on said pressure responsive means, the free end of said arm being adapted to move arcuately across said strips, said free end having a plurality of linearly aligned contact points thereon for making contact with any one of said conducting segments whereby only one of said circuits is switched into said input at any one time.

3. In a radiosonde having a carrier transmitter modulated by a self-blocking oscillator wherein the frequency of said oscillator is varied by switching into the input thereof temperature responsive, humidity responsive, high and low reference circuits, multi-position switching means comprising a plurality of arcuate strips in spaced concentric arrangement, each of said strips having two groups of interleaved conducting segments separated by insulating segments, each of said conducting segments being disposed along discrete radii, a first of said groups having a first common connection to said temperature responsive circuit, a second of said groups having a second common connection to said humidity responsive circuit and the third and fourth of said groups having common connections for switching into said high and low reference circuits respectively.

References Cited in the file of this patent

UNITED STATES PATENTS

| | | |
|---|---|---|
| 2,081,184 | Ross et al. | May 25, 1937 |
| 2,283,919 | Diamond et al. | May 26, 1942 |
| 2,381,099 | Siderman | Aug. 7, 1945 |
| 2,558,342 | Cosby | June 26, 1951 |